Figure 1:
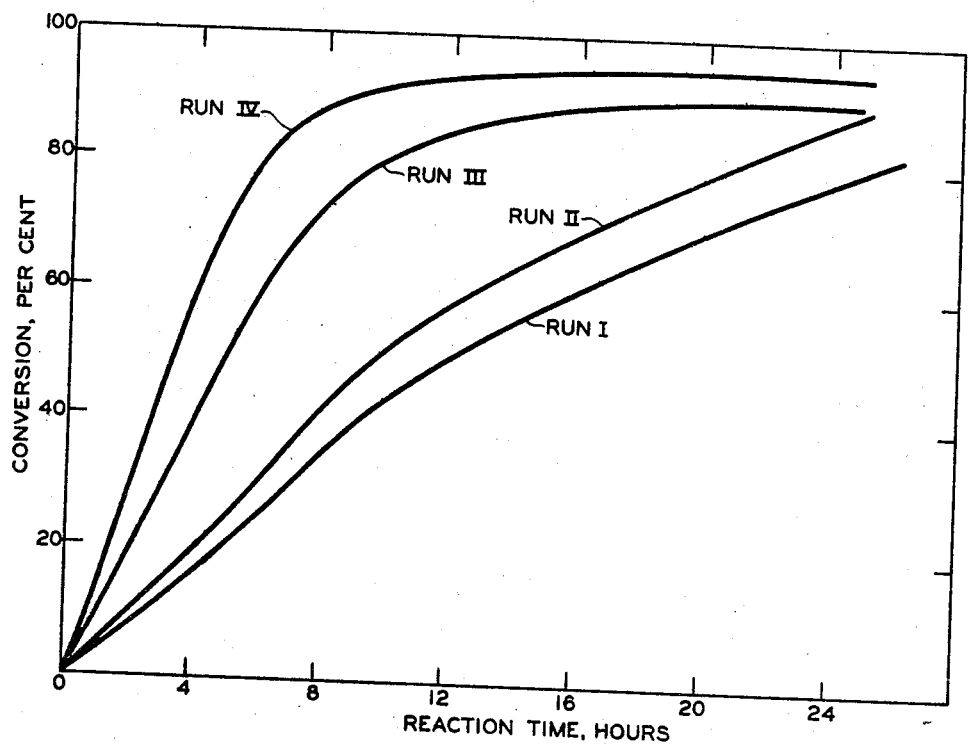

INVENTORS
C. F. FRYLING
A. E. FOLLETT

Patented Aug. 10, 1954

2,686,165

UNITED STATES PATENT OFFICE 2,686,165

EMULSION POLYMERIZATION IN THE PRESENCE OF A SYNERGISTIC COMBINATION OF EMULSIFIERS WITH CERTAIN TRISUBSTITUTED HYDROPEROXYMETHANES

Charles F. Fryling, Phillips, and Archie E. Follett, Borger, Tex., assignors to Phillips Petroleum Company, a corporation of Delaware Application April 20, 1950, Serial No. 157,132

17 Claims. (Cl. 260—27)

This invention relates to an improved process for polymerizing unsaturated organic compounds while dispersed in an aqueous emulsion. In one important aspect this invention relates to the use of faster recipes at low polymerization temperatures for effecting production of synthetic rubber by emulsion polymerization of conjugated diolefins. This application is a continuation-in-part of our copending application Serial No. 72,534, filed January 24, 1949.

Numerous variations in recipes and procedures have been developed for carrying out emulsion polymerization reactions at low temperatures. Recipes of the redox type, that is, formulations wherein both oxidizing and reducing components are present, have been widely used. Oxidizing components frequently employed include materials also of a peroxidic nature and particularly compounds such as benzoyl peroxide and cumene hydroperoxide. Even though many peroxidic materials function in the capacity of the oxidant in a redox emulsion polymerization system, this is not the case with all peroxides since in some instances little, if any, polymerization occurs while in other cases with different peroxides the reaction takes place at a satisfactory rate. Some peroxides may function satisfactorily at higher temperatures but are of less value when it is desired to carry out polymerizations at low temperatures.

Emulsifying agents of different types have been used in the production of synthetic elastomers by emulsion polymerization processes and it is known that they have an effect on the properties of the finished products and also on the reaction rate. Rosin acids are known to impart desirable properties to a raw rubber product, particularly when present in limited amounts. Polymerizations have been carried out using rosin soaps as the emulsifying agents in order that rosin acids will be left in the product. However, there are certain limitations in the use of rosin soaps as emulsifiers, particularly for low temperature polymerizations, since with many recipes which include rosin soaps reaction rates are very slow. Furthermore the quantity of rosin acid desired in the finished product is often appreciably more than that which would be present if a rosin soap were used as only a small part of the emulsifying agent in the polymerization process.

We have now discovered a method whereby synthetic rubber containing a substantial amount of rosin acid can be produced by a low temperature emulsion polymerization process through the use of an improved redox recipe. The method involves the use of a specific type of redox polymerization recipe in which the oxidizing ingredient comprises a hydroperoxide composition comprising a trisubstituted hydroperoxymethane having at least ten carbon atoms per molecule and the emulsifying agent comprises a composition in which a potassium rosin soap and certain specific potassium fatty acid soaps are components. A synergistic effect is produced by the combination of these two types of ingredients, that is, the oxidant and the emulsifier composition, thus resulting in greatly increased conversion rates.

An object of this invention is to polymerize unsaturated organic compounds while dispersed in an aqueous emulsion.

Another object of this invention is to provide an improved process for the production of synthetic rubber.

A further object of our invention is to shorten the reaction time necessary for the production of synthetic rubber by emulsion polymerization of monomeric materials.

A still further object of our invention is to produce a synthetic rubber having the desirable properties resulting from production by polymerization at a low temperature and also from having a rosin acid intimately admixed therewith.

Still another object of our invention is to produce synthetic rubber at a low reaction temperature.

Further objects and advantages of our invention will become apparent, to one skilled in the art, from the accompanying disclosure and discussion.

The oxidant which forms one component of the synergistic mixture is a trisubstituted hydroperoxymethane having at least ten carbon atoms per molecule, and can be represented by the formula RR'R"COOH wherein R is selected from the group consisting of organic radicals, and each of R' and R" is an organic radical, or R'R" together comprise a tetramethylene or pentamethylene group forming with the

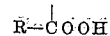

a cyclopentyl or cyclohexyl hydroperoxide. Each of R, R' and R" can be completely hydrocarbon in character, and can be of mixed character, such as aralkyl, alkaryl, and the like, and can also have non-hydrocarbon substituents, some of which will have the effect of making them more water-soluble and less oil (hydrocarbon)-soluble; particularly useful non-hydrocarbon substituents include oxygen in the form of hydroxy and ether compounds, sulfur in similar compounds (i. e. mercapto compounds and thioethers), and halogen compounds. Examples of such hydroperoxides include phenylcyclohexane hydroperoxide, octahydrophenanthrene hydroperoxide, diisopropylbenzene hydroperoxide (dimethyl (isopropylphenyl) hydroperoxymethane), methylethyl(ethoxyphenyl)hydroperoxymethane, methyl(methylphenyl) decylhydroperoxymethane, dimethyldecylhydroperoxymethane, methyl (chlorophenyl) phenylhydroperoxymethane, and tertiarybutylisopropylbenzene hydroperoxide (dimethyl(tertiarybutylphenyl) hydroperoxymethane). Such hydroperoxides can be easily prepared by simple oxidation, with free oxygen, of the corresponding hydrocarbon or hydrocarbon derivative, i. e. of the parent trisubstituted methane. The compound to be oxidized is placed in a reactor, heated to the desired temperature, and oxygen introduced at a controlled rate throughout the reaction period. The mixture is agitated during the reaction which is generally allowed to continue from about one to ten hours. The temperature employed is preferably maintained between 50 and 160° C., although in some instances it might be desirable to operate outside this range, that is, at either higher or lower temperatures. At the conclusion of the reaction the oxidized mixture may be employed as such, that is, as a solution of the hydroperoxide composition in the parent compound, or unreacted compound may be stripped and the residual material employed. The major active ingredient in such a composition is the monohydroperoxide, or a mixture of monohydroperoxides. This hydroperoxide group appears to result from introduction of two oxygen atoms between the carbon atom of the trisubstituted methane and the single hydrogen atom attached thereto. Where there is another similar grouping in the molecule, the usual method of production just outlined appears to produce only the monohydroperoxide even though a dihydroperoxide appears to be structurally possible. Thus, in a simple case, from such an oxidation of diisoproplybenzene the primary product appears to be dimethyl(isopropylphenyl) hydroperoxymethane.

One large group of these hydroperoxymethanes is that group in which each of the three substituent groups is a hydrocarbon radical. One of the subgroups of these compounds is the alkaryldialkyl hydroperoxymethanes, in which the two alkyl groups are relatively short, i. e. have from one to three or four carbon atoms each, including dimethyl(tertiarybutylphenyl)hydroperoxymethane, dimethyl(diisopropylphenyl) hydroperoxymethane, dimethyl(isopropylphenyl) hydroperoxymethane, dimethyl(dodecylphenyl) hydroperoxymethane, dimethyl(methylphenyl) hydroperoxymethane, and corresponding methylethyl and diethyl compounds, and the like. Another subgroup includes at least one long alkyl group directly attached to the hydroperoxymethane, such as methyldecyl(methylphenyl) hydroperoxymethane, ethyldecylphenylhydroperoxymethane, and the like. Still another subgroup includes trialkyl compounds, such as dimethyldecylhydroperoxymethane, and the like; aralkyl compounds, such as 1-phenyl-3-methyl-3-hydroperoxybutane, can also be considered to be members of this group. A further subgroup includes alkyldiaryl compounds, such as methyldiphenylhydroperoxymethane, methylphenyltolylhydroperoxymethane, and the like. A further subgroup is the triaryl compounds, such as triphenylhydroperoxymethane, tritolylhydroperoxymethane, and the like. These materials preferably will have a total of not more than thirty carbon atoms per molecule. A further subgroup comprises substituted cyclopentyl and cyclohexyl hydroperoxides, such as result from oxidation of phenylcyclohexane, phenylcyclopentane, 1,2,3,4, 4a, 9,10,10a-octahydrophenanthrene, etc.

The emulsifying agents used in the practice of this invention comprise forty to eighty per cent of a potassium rosin soap with which is incorporated sixty to twenty per cent of a potassium fatty acid soap having from fourteen to eighteen, inclusive, carbon atoms per molecule. The rosin soaps are prepared from rosin acids by treatment with potassium hydroxide. The rosin acids may be obtained from any source, for example, from wood, gums, etc., and may be used as such or treated in various ways to effect purification. The disproportionated rosin acids, that is, rosin acids treated in such a way that selective dehydrogenation and hydrogenation occur, are particularly effective. Specific examples of rosin acid components which are applicable are abietic acid and dehydro-, dihydro- and tetrahydroabietic acids. Materials found to be particularly effective are the potassium salt of tetrahydroabietic acid and mixtures of potassium salts of dehydro-, dihydro-, and tetrahydroabietic acids. One particularly advantageous soap of this nature is commercially available as Dresinate S-134 and another as Dresinate 214.

The fatty acid soaps employed are potassium salts of fatty acids such as myristic, palmitic, stearic, or oleic acid, or mixtures thereof, the potassium soap formed from hydrogenated tallow acid, and the like. As will be shown hereinafter in Example I, a particularly desirable soap of fatty acids of high molecular weight for use in this synergistic combination is a mixture of potassium salts of the acids in hydrogenated tallow acids which is commercially available as K-SF flakes and also as K-ORR (Potassium-Office Rubber Reserve) soap, and which has been manufactured to meet the following specifications.

| | |
|---|---|
| Iodine no. | 52 maximum. |
| Iodine no. minus thiocyanogen no. | Not to exceed 6. |
| Saturated acid below $C_{12}$ | 1.0% maximum. |
| Unsaturated acid above $C_{18}$ | 2.0% maximum. |
| Saturated acid above $C_{18}$ | 5.0% maximum. |

This soap is primarily a mixture of the potassium salts of saturated fatty acids having from fourteen to eighteen carbon atoms per molecule.

The total amount of the combined soaps which is used will be between about 1 and about 10 parts by weight per 100 parts by weight of monomeric material; it will depend somewhat upon the characteristics of the monomeric material, the relative amounts of monomeric material and aqueous phase, and also upon the characteristics of the antifreeze agent present in the aqueous phase, when such is used. With the usual butadiene-styrene monomeric material and with methanol in the aqueous phase in the usual recipes, the total amount of combined soaps is usually between 3 and 6 parts by weight per 100 parts of monomeric material.

The present process affords the advantages realized through the use of rosin soap recipes as well as the advantages attendant in low temperature polymerizations and it is unusually versatile since a product of any rosin acid content is readily obtained. Polymerization is effected at rapid rates at low temperatures to give products which are characterized particularly by their excellent retention of tensiles and extensibilities at elevated temperatures, their improved tack, and their exceptionally good hysteresis-flex life balance.

Figure 2:
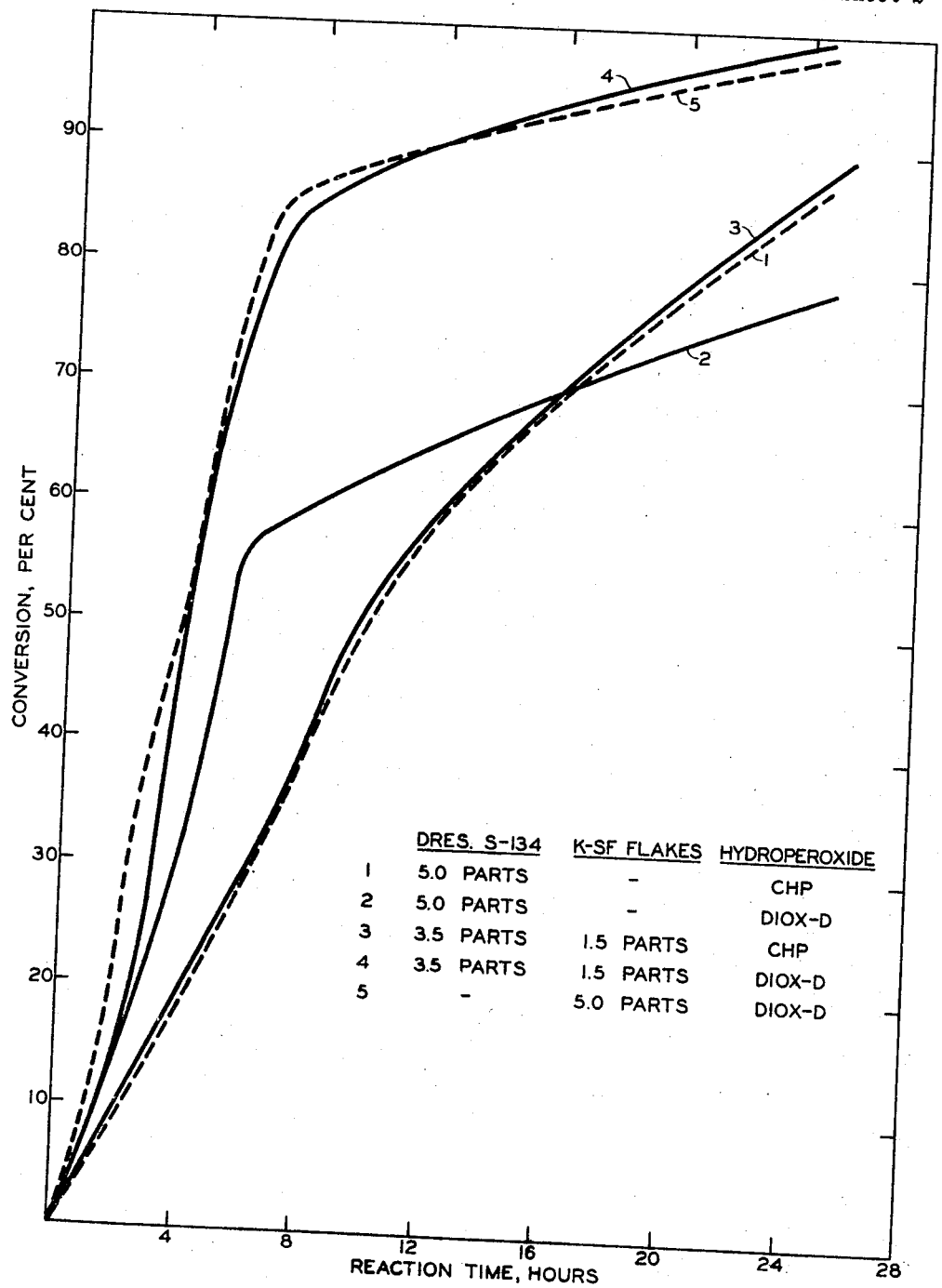

The synergistic effect obtained through the combined action of these hydroperoxide compositions of high molecular weight as the oxidant and the rosin soap-potassium fatty acid soap emulsifier composition is a significant feature of the invention. While it would appear that other combinations of oxidizing agents and emulsifying agents could be used, they do not give the rapid polymerization rates that are obtained when operating according to the process herein described. The magnitude of the synergistic effect will be more apparent by referring to Figures 1 and 2 which show the contrast in results obtained in a series of polymerization runs in which different combinations of oxidants and emulsifiers are employed in comparison with the preferred combination of this invention. In the runs of Figure 1, based on data in Example I, the amounts of rosin soap and fatty acid soap were kept constant but the kind of fatty acid soap was varied as well as the oxidant. Similar curves are in Figure 2, based on data in Example V.

Temperatures employed may range from —40 to 0° C., with temperatures below —5° C. being most generally preferred. The recipe will also include a reductant compound or composition, which can be a single compound or a mixture of homologous compounds, such as polyamino compounds and/or carbamates thereof, or an easily oxidizable hydroxy compound, such as the aldoses and ketoses, including dihydroxyacetone and various reducing sugars such as glucose, levulose, sorbose, invert sugar, and the like. With such hydroxy compounds an oxidation catalyst is usually included, such as an inorganic complex of a multivalent metal which can exist in aqueous solution in either of two valence states, such as compounds of iron, manganese, copper, vanadium, cobalt, etc. The multivalent metal ion of the oxidation catalyst can easily and readily pass from a low valence state to a higher valence state, and vice versa. Sometimes this compound, when present in its lower valence state, can function in the dual role of reductant and oxidation catalyst. One commonly used oxidation catalyst is an iron pyrophosphate, and is separately made up in aqueous solution from a ferrous salt, such as ferrous sulfate, and a pyrophosphate of an alkali metal, such as sodium or potassium. When carrying out a polymerization reaction, the amounts of each of these initiator components, that is, the pyrophosphate, the ferrous salt, and the peroxidic compound, may vary from 0.01 to 3 millimols per 100 parts of monomers, with the preferred quantities being in the range from 0.1 to 2.5 millimols. When an organic reducing agent such as a sugar is included in the polymerization system, the amounts of the activator ingredients usually will not exceed 1.5 millimols. The amount of sugar will usually not exceed 4 parts per 100 parts of monomeric material and in most instances will be between 0.5 and 2 parts. The quanitites employed are governed by the polymerization recipe used and the operating temperature. The same units of weight should, of course, be used throughout any one recipe, i. e., when the monomer is measured in pounds these other ingredients are measured in millipound mols.

In other recipes no such oxidation catalyst is necessary. This is particularly true when the reductant is a polyamino compound, or mixture thereof, such as hydrazine, ethylenediamine, diethylenetriamine, aminoethylethanolamine, ethylenemethylethylenetriamine, tetraethylenepentamine, and the like. These compounds have the general formula

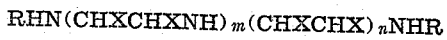

where each R contains not more than eight carbon atoms and is of the group consisting of hydrogen, aliphatic, cycloaliphatic, aromatic, olefinic, and cycloolefinic radicals, and each X contains not more than three carbon atoms and is of the group consisting of hydrogen and aliphatic radicals, $m$ is an integer between 0 and 8, inclusive, and $n$ is an integer of the group consisting of 0 and 1 and is 1 when $m$ is greater than 0. Each of the foregoing radicals (other than hydrogen) can be completely hydrocarbon in character, and can be of mixed character when containing six or more carbon atoms, such as alkylcycloalkyl, aralkyl, alkaryl groups, and the like, and can also have non-hydrocarbon substituents, some of which will have the effect of making them more water-soluble and less oil(hydrocarbon)-soluble; particularly useful non-hydrocarbon substituents include oxygen in the form of hydroxy and ether compounds, sulfur in similar compounds (i. e. mercapto compounds and thioethers) and halogen compounds. In such recipes, such a polyamino compound appears to act as a reductant, and no other activating ingredients, such as compounds of polyvalent-multivalent metals, or reducing ingredients, such as a reducing sugar, need be present in order to obtain satisfactory and rapid polymerization of the monomeric material, even at subfreezing temperatures. The amount of polyamino compound used to obtain optimum results also is dependent upon other ingredients in the recipe. Preferred results are usually obtained with between 0.02 to 5 parts by weight, per 100 parts of monomeric material, of the polyamino compound.

When a ferrous pyrophosphate activator is used, it is preferably prepared by admixing a ferrous salt, such as ferrous sulfate, with a pyrophosphate of an alkali metal, such as sodium or potassium, and water and heating this mixture, preferably for the length of time required for maximum activity. A reaction occurs between the salts, as evidenced by the formation of a grayish-green precipitate. When preparing the activator the mixture is generally heated above 50° C., for variable periods depending upon the temperature. For example, if the mixture is boiled, a period of twenty minutes or less is sufficient to produce the desired activity, and the time of boiling may even be as low as 30 seconds. One convenient method of operation involves maintaining the temperature of the activator solution at about 60° C. for a period of heating ranging from 10 to 30 minutes. Prior to heating the activator mixture the vessel is usually flushed with an inert gas such as nitrogen. In general it is preferred to heat the mixture below the boiling point, say at a temperature around 55 to 75° C.

In cases where the activator is prepared just prior to use, it is generally employed in the form of an aqueous dispersion as described above. However, the solid activator may be isolated and the crystalline product used, and in this form it is preferred in some instances. Subsequent to heating the activator mixture, it is cooled to around room temperature and the solid material separated by centrifugation, filtration, or other suitable means, after which it is dried. Drying may be accomplished in vacuo in the presence of a suitable drying agent, such as calcium chloride, and in an inert atmosphere such as nitrogen. When using this crystalline product in emulsion polymerization reactions, it is generally charged to the reactor just prior to introduction of the butadiene. This crystalline material is believed to be a sodium ferrous pyrophosphate complex, such as might be exemplified by the formula $2Na_2FeP_2O_7 \cdot Na_4P_2O_7$, or perhaps

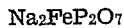

$$Na_2FeP_2O_7$$

In any event the complex, whatever its composition, is only slightly soluble in water and is one active form of ferrous ion and pyrophosphate which can be successfully used in our invention. It may be incorporated in the polymerization mixture as such, or dissolved in sufficient water to produce solution. Other forms of multivalent metal and pyrophosphate may also be used, so long as there is present in the reacting mixture a soluble form of a multivalent metal, capable of existing in two valence states and present primarily in the lower of two valence states, and a pyrophosphate.

The amounts of activator ingredients are usually expressed in terms of the monomers charged. The multivalent metal should be within the range of 0.10 to 3 millimols per 100 parts by weight of monomers, with 0.2 to 2.5 millimols being generally preferred. The amount of pyrophosphate should be within the range of 0.10 to 5.6 millimols based on 100 parts by weight of monomers; however, the narrower range of 0.2 to 2.5 millimols is more frequently preferred. The mol ratio of ferrous salt to alkali metal pyrophosphate can be between 1:0.2 and 1:3.5, with a preferred ratio between 1:0.35 and 1:2.8.

In effecting emulsion polymerization of a monomeric material, particularly when a batch-type or semi-batch-type operation is carried out, the reactor is usually first charged with the aqueous medium, which contains the desired emulsifying agent, and the monomeric material is then admixed with agitation of the contents. At the same time a reaction modifier, such as a mercaptan, is also included, usually in solution in at least a part of the monomeric material. An activator solution and an oxidant are separately added to the reaction mixture, and reaction then proceeds. A preferred manner of adding these two constituents is usually to have the activator solution incorporated in the aqueous medium prior to addition of the monomeric material, and to add the oxidant as the last ingredient. Sometimes, however, satisfactory polymerization results can be obtained when this procedure is reversed. It is also sometimes the practice to add portions of one or the other of the activator solutions and oxidant intermittently, or continuously, during the course of the reaction. If the operation is carried out continuously, streams of the various ingredients are admixed in somewhat the same order prior to their final introduction into the polymerization reaction zone.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight.

It is generally preferred that the emulsion be of an "oil in water" type, with the ratio of aqueous medium to monomeric material between about 0.5:1 and about 2.75:1, in parts by weight. It is frequently desirable to include water-soluble components in the aqueous phase, particularly when the polymerization temperatures are below freezing. Inorganic salts and alcohols can be so used. Alcohols which are applicable, when operating at low temperatures, comprise water-soluble compounds of both the monohydric and polyhydric types, and include methyl alcohol, ethylene glycol, glycerine, erythritol, and the like. The amount of alcoholic ingredient used in a polymerization recipe must be sufficient to prevent freezing of the aqueous phase and generally ranges from 20 to 80 parts per 100 parts of monomers charged. In most cases the amount of water employed is sufficient to make the total quantity of the alcohol-water mixture equal 150 to 200 parts. In cases where it is desired to use a larger quantity of the alcohol-water mixture, say around 250 parts, the amount of alcohol may be increased to as much as 120 parts. It is preferred that the alcohol be such that it is substantially insoluble in the non-aqueous phase, and that 90 per cent, or more, of the alcohol present be in the aqueous phase. A high-boiling alcohol such as glycerine is difficult to recover from the resulting serum; a low-boiling alcohol such as methanol is easily removed and frequently preferred. Other aliphatic alcohols which are higher-boiling than methanol, such as a propanol, are frequently less satisfactory. If the resulting latex tends to gel at low reaction temperatures, a larger proportion of aqueous phase should be used. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase. Usually 50 to 98 per cent of the monomeric material is polymerized.

The pH of the aqueous phase may be varied over a rather wide range without producing deleterious effects on the conversion rate or the properties of the polymer. In general the pH can be within the range of 9 to 12, with the narrower range of 9.5 to 10.5 being most generally preferred, except when a polyamino compound is used as a reductant, in which case a somewhat higher pH should usually be used.

In preparing synthetic rubber by polymerizing conjugated dienes by the process of the invention, it is usually desirable to use a polymerization modifying agent, as is usually true in other polymerizations to produce synthetic rubber. Preferred polymerization modifiers for use in the process of the present invention are alkyl mercaptans, and these may be of primary, secondary, or tertiary configurations, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, and the results desired. In general, the greater modification is obtained when operating at low temperatures and therefore a smaller amount of mercaptan is added to yield a product of a given Mooney value, than is used at higher temperatures. In the case of tertiary mercaptans, such as tertiery $C_{12}$ mercaptans, blends of tertiary $C_{12}$, $C_{14}$, and $C_{16}$ mercaptans, and the like, satisfactory modification is obtained with 0.05 to 0.3 part mercaptan per 100 parts monomers, but smaller or larger amounts may be employed in some instances. In fact, amounts as large as 2.0 parts per 100 parts of monomers may be used. Thus the amount of mercaptan is adjusted to suit the case at hand.

The amount of hydroperoxide used to obtain an optimum reaction rate will depend upon the other reaction conditions, and particularly upon the type of polymerization recipe used. The amount is generally expressed in millimols per 100 parts of monomeric material, using in each instance the same units of weight throughout, i. e. when the monomeric material is measured in pounds the hydroperoxide is measured in millipound mols. The same is true for other ingredients of the polymerization recipe. An optimum rate of polymerization is usually obtained with the amount of hydroperoxide between 0.1 and 10 millimols per 100 parts by weight of monomeric material. The hydroperoxide can frequently be easily separated from accompanying materials by converting it to a corresponding salt of an alkali metal, which is usually a crystalline material in a pure or concentrated state at atmospheric temperatures, and separating the salt. This salt can be used as an active form of the hydroperoxide, since it is promptly converted to the hydroperoxide by hydrolysis when the salt is admixed with the aqueous medium of the polymerization reaction mixture.

Advantages of this invention are illustrated by the following examples. The reactants, and their proportions, and the other specific ingredients of the recipes are presented as being typical and should not be construed to limit the invention unduly.

*Example I*

The copolymerization of butadiene and styrene was carried out according to the following recipe:

| | Parts by weight |
|---|---|
| Butadiene | 70. |
| Styrene | 30. |
| Water (total) | 192. |
| Methanol | 48. |
| Potassium tetrahydroabietate. | 3.5 |
| Potassium soap of fatty acids (see below). | 1.5 |
| Mercaptan blend [1] | 0.25 |
| Organic hydroperoxide | (See below.) |
| Activator solution: | |
|    Potassium chloride | 0.4 |
|    Ferrous sulfate heptahydrate ($FeSO_4.7H_2O$). | 0.2 (0.72 millimol). |
|    Sodium pyrophosphate decahydrate $Na_4P_2O_7.10H_2O$. | 0.32 (0.72 millimol). |

[1] A blend of tertiary $C_{12}$, $C_{14}$, and $C_{16}$ aliphatic mercaptans in a ratio of 3:1:1 parts by weight.

Preparation of the activator composition was effected by dissolving the ferrous sulfate, sodium pyrophosphate, and potassium chloride in the requisite quantity of water and heating the resulting mixture at 60° C. for 40 minutes. Concentrations of ingredients were adjusted in such a way that 25 ml. of the activator solution was used per 100 grams of monomers charged.

Polymerization was carried out at −10° C. according to the conventional procedure.

Four runs were carried out under the same conditions using the same recipe except that different combinations of emulsifying agents and oxidants were employed. In the first run, 1.5 parts potassium laurate was used as the fatty acid with 0.12 part cumene hydroperoxide (CHP).

Runs were also conducted to determine the effect of the substitution of the potassium soap of hydrogenated tallow acid for the potassium laurate and the substitution of an equimolecular amount of dimethyl(isopropylphenyl) hydroperoxymethane, also known as diisopropylbenzene hydroperoxide and as Diox-D, for the cumene hydroperoxide. The data which follow show that substantial advantages were realized when combinations other than potassium laurate/cumene hydroperoxide were used. However, a pronounced superadditive or synergistic effect was obtained by the combination of a mixture of potassium tetrahydroabietate with the potassium soap of hydrogenated tallow acid together with diisopropylbenzene hydroperoxide, as the oxidant.

| Run No. | Mixture of potassium tetra-hydroabietate and— | Hydroperoxide | | Conversion, Percent at— | | | |
|---|---|---|---|---|---|---|---|
| | | | | 3.0 hours | 6.0 hours | 9.0 hours | 24.5 hours |
| | | | Parts / Millimol | | | | |
| I | K laurate | CHP | 0.12 / 0.79 | 12 | 25 | 39 | 79 |
| II | K hydrogenated tallow acid | CHP | 0.12 / 0.79 | 15 | 29 | 47 | 88 |
| III | K laurate | Diox-D | 0.15 / 0.77 | 29 | 60 | 81 | 90 |
| IV | K hydrogenated tallow acid | Diox-D | 0.15 / 0.77 | 44 | 79 | 92 | 95 |

These results are also shown in Figure I.

The magnitude of this synergistic effect is shown by the following table wherein the sums of the improvements in per cent conversion of runs II and III are contrasted with the improvement effected by run IV.

| Comments | Improved Conversion in Percent at— | | |
|---|---|---|---|
| | 3.0 Hours | 6.0 Hours | 9.0 Hours |
| Improvement in Run II over Run I | 3 | 4 | 8 |
| Improvement in Run III over Run I | 17 | 35 | 42 |
| Improvement in Run IV over Run I: | | | |
| A. Calculated from above | 20 | 39 | 50 |
| B. Actual | 32 | 54 | 53 |

If the effect were merely additive, as would be expected, the data showing the combined effects of II and III would represent the improvement in results actually obtained over the potassium laurate/cumene hydroperoxide combination. However, IV shows the improvement actually realized. In a 6.0-hour period the actual improvement effected was about 38.5 per cent greater than the calculated improvement.

*Example II*

The copolymerization of butadiene and styrene was carried out according to the following recipe:

| | Parts by weight |
|---|---|
| Butadiene | 70. |
| Styrene | 30. |
| Water | 192. |
| Methanol | 48. |
| Potassium tetrahydroabietate | Variable. |
| Hydrogenated tallow acid, K soap | Variable. |
| Mercaptan blend [1] | 0.25. |
| Diisopropylbenzene hydroperoxide composition [2] | 0.15 (0.77 millimol). |
| Potassium chloride | 0.4. |

[1] A blend of tertiary $C_{12}$, $C_{14}$, and $C_{16}$ aliphatic mercaptans in a ratio of 3:1:1 parts by weight.
[2] Calculation based on 100 per cent diisopropylbenzene hydroperoxide (Diox-D).

| | Parts by weight |
|---|---|
| Ferrous sulfate, $FeSO_4 \cdot 7H_2O$ | 0.2 (0.72 millimol). |
| Sodium pyrophosphate, $Na_4P_2O_7 \cdot 10H_2O$ | 0.32 (0.72 millimol). |

Preparation of the activator composition was effected by dissolving the ferrous sulfate, sodium pyrophosphate, and potassium chloride in the requisite quantity of water and heating the resulting mixture at 60° C. for 40 minutes. Concentrations of ingredients were adjusted in such a way that 25 ml. of the activator solution was used per 100 grams of monomers charged.

Polymerization was carried out at −10° C. according to the conventional procedure, varying the ratio of the potassium tetrahydroabietate to the potassium soap of the hydrogenated tallow acid. The following results were obtained:

| Run | K Rosin Soap, Parts | K Fatty Acid Soap, Parts | Time to 60% Conversion, Hours |
|---|---|---|---|
| I | 4.0 | 1.0 | 4.9 |
| II | 3.5 | 1.5 | 4.6 |
| III | 2.5 | 2.5 | 5.3 |
| IV | 1.5 | 3.5 | 5.0 |
| V | 1.0 | 4.0 | 6.6 |

A maximum conversion rate for run II is clearly shown.

*Example III*

The recipe of Example II was followed for two runs except that the initiator level was adjusted to 1.0 millimol, that is, 0.28 part ferrous sulfate, 0.45 part sodium pyrophosphate, and 0.21 part diisopropylbenzene hydroperoxide were used. In one run 1.5 parts of the potassium soap of hydrogenated tallow acid was used in conjunction with 3.5 parts of a rosin soap comprised of a mixture of the potassium salts of dehydro-, dihydro-, and tetrahydroabietic acids, and in the other 5.0 parts of the same rosin soap were employed. The potassium chloride was decreased to 0.3 part. The time-conversion data were as follows:

| Emulsifier | Conversion, Percent, at— | | | |
|---|---|---|---|---|
| | 2.0 Hours | 4.0 Hours | 7.0 Hours | 24.0 Hours |
| Mixed potassium rosin soap/potassium fatty acid soap | 17 | 38 | 68 | 97 |
| Mixed potassium rosin soap | 0 | 0 | 3 | 8 |

*Example IV*

The recipe of Example II was followed except for the emulsifier. The rosin soap component comprised a mixture of potassium salts of dehydro-, dihydro-, and tetrahydroabietic acids. A series of runs was made in which the initiator level was varied from 0.3 to 1.5 millimols but the same ratio of ferrous sulfate/sodium pyrophosphate/diisopropylbenzene hydroperoxide was maintained; i. e. the ferrous sulfate in these runs was varied from 0.083 to 0.417 part (0.3 to 1.5 millimols) per 100 parts of monomers and the amounts of the other initiator ingredients were adjusted accordingly. The following tabulation shows the results obtained.

| Millimols Initiator | Conversion, Percent | | | |
|---|---|---|---|---|
| | 2.0 Hours | 4.0 Hours | 7.0 Hours | 24.0 Hours |
| 0.3 | 8 | 19 | 36 | 82 |
| 0.5 | 13 | 30 | 58 | 95 |
| 0.7 | 13 | 31 | 60 | 95 |
| 1.0 | 17 | 38 | 68 | 97 |
| 1.5 | 13 | 28 | 51 | 92 |

When cumene hydroperoxide was employed as the oxidant in this system, practically no polymerization resulted.

*Example V*

A series of runs was conducted, using the following recipes.

| | Recipes | | | | |
|---|---|---|---|---|---|
| | 1 | 2 | 3 | 4 | 5 |
| Butadiene | 70 | 70 | 70 | 70 | 70 |
| Styrene | 30 | 30 | 30 | 30 | 30 |
| Water | 192 | 192 | 192 | 192 | 192 |
| Methanol | 48 | 48 | 48 | 48 | 48 |
| K tetrahydroabietate (Dresinate S-134) | 5.0 | 5.0 | 3.5 | 3.5 | |
| Hydrogenated tallow acid, K salt (K-SF flakes) | | | 1.5 | 1.5 | 5.0 |
| Mercaptan blend | 0.21 | 0.25 | 0.25 | 0.25 | 0.25 |
| Cumene hydroperoxide (CHP) | 0.12 | | 0.12 | | |
| Diisopropylbenzene hydroperoxide (Diox-D) | | 0.15 | | 0.15 | 0.15 |
| Potassium chloride | 0.4 | 0.4 | 0.4 | 0.4 | 0.4 |
| Ferrous sulfate, $FeSO_4 \cdot 7H_2O$ | 0.2 | 0.2 | 0.2 | 0.2 | 0.2 |
| Sodium pyrophosphate, $Na_4P_2O_7 \cdot 10H_2O$ | 0.32 | 0.32 | 0.32 | 0.32 | 0.32 |

Polymerizations were carried out at —10° C. The following results were obtained:

| Recipe | Rosin Soap, Parts | Fatty Acid Soap, Parts | Hydroperoxide | Conversion, Percent | | | | | | | | |
|---|---|---|---|---|---|---|---|---|---|---|---|---|
| | | | | 2 Hrs. | 3 Hrs. | 4 Hrs. | 6 Hrs. | 7 Hrs. | 9 Hrs. | 11 Hrs. | 24 Hrs. | 24.5 Hrs. |
| 1 | 5 | | CHP | | | | | 35 | | 55 | 86 | |
| 2 | 5 | | Diox-D | 15 | | 32 | | 56 | | | 78 | |
| 3 | 3.5 | 1.5 | CHP | | 15 | | 29 | | 47 | | | 88 |
| 4 | 3.5 | 1.5 | Diox-D | | 29 | 53 | | 83 | | | 99 | |
| 5 | | 5 | Diox-D | 24 | | 52 | | 85 | | | 98 | |

The relative reaction rates are more easily seen when these data are plotted as curves. This has been done in Figure 2. Here the contrast of the results of recipe 4 with receipts 1, 2 and 3 is clearly shown. It is also interesting to note the similarity between the results of recipes 4 and 5, and the contrast with recipe 2. The large amount of rosin soap has not apparently altered the reaction rate, even though with this particular oxidant the use of rosin acid soap alone resulted in a much slower reaction rate.

*Example VI*

Similar fast reaction rates are obtained with such a synergistic mixture of potassium soaps of rosin acids and potassium soaps of higher fatty acids, when used together with various tri-substituted hydroperoxy methanes, as shown by the following data. The following polymerization recipe was employed:

| | Parts by weight |
|---|---|
| Butadiene | 70. |
| Styrene | 30. |
| Water, total | 192. |
| Methanol | 48. |
| Dresinate 214[1], pH 10.1 | 3.5. |
| Hydrogenated tallow acid, K soap | 1.5. |
| Mercaptan blend[2] | 0.25. |
| Hydroperoxide | Variable. |
| Ferrous sulfate, $FeSO_4 \cdot 7H_2O$ | 0.084 (0.3 millimol). |
| Sodium pyrophosphate, $Na_4P_2O_7 \cdot 10H_2O$ | 0.135 (0.3 millimol). |
| Potassium chloride | 0.25. |

[1] A mixture of the potassium salts of dehydro-, dihydro-, and tetrahydroabietic acids.
[2] See Example I.

Preparation of the activator was effected by heating an aqueous solution of the ferrous sulfate, sodium pyrophosphate, and potassium chloride at 60° C. for 40 minutes. Polymerization was carried out at —10° C. using the conventional procedure. The following data were obtained on comparative runs using different hydroperoxides.

| Hydroperoxide | | | Conversion, Percent | | | |
|---|---|---|---|---|---|---|
| Type | Parts | Millimols | 2.0 hrs. | 4.0 hrs. | 7.0 hrs. | 24.0 hrs. |
| Cumene | 0.051 | 0.33 | 4 | 10 | 18 | 44 |
| Diisopropylbenzene | 0.064 | 0.33 | 7 | 20 | 38 | 74 |
| Triisopropylbenzene | 0.078 | 0.33 | 9 | 25 | 49 | 83 |
| Tert-butylisopropylbenzene | 0.069 | 0.33 | 13 | 32 | 55 | 87 |
| Dodecylisopropylbenzene | 0.106 | 0.33 | 11 | 24 | 46 | 84 |

The triisopropylbenzene hydroperoxide composition (primarily dimethyl (diisopropylphenyl) hydroperoxymethane) was prepared by the oxidation of triisopropylbenzene at 100° C. in the presence of an initiator comprising 1.0 part of the potassium salt of disopropylbenzene hydroperoxide per 100 parts of the hydrocarbon to be oxidized. The reaction was continued for a period of 3.25 hours. The concentration of hydroperoxide in the reaction mixture was 24.6 per cent. The tertiarybutyl isopropylbenzene hydroperoxide (primarily dimethyl(tertiarybutylphenyl) hydroperoxymethane) was effected by the oxidation of tert-butylisopropylbenzene at 125° C. using as an initiator 0.46 part of the potassium salt of diisopropylbenzene hydroperoxide per 100 parts of the hydrocarbon to be oxidized. The reaction was allowed to proceed 5 hours at which time the concentration of hydroperoxide in the mixture was 16.05 per cent.

The dodecylisopropylbenzene hydroperoxide (primarily dimethyl(dodecylphenyl)hydroperoxymethane) was prepared by the oxidation of dodecylisopropylbenzene, which had been previously prepared by the alkylation of isopropylbenzene with 1-dodecene. This dodecylisopropylbenzene was oxidized at 130° C. to form dodecylisopropylbenzene hydroperoxide. As an initiator 0.9 part of the potassium salt of diisopropylbenzene hydroperoxide per 100 parts of the hydrocarbon to be oxidized was employed. After a six-hour reaction period the concentration of peroxide in the reaction mixture was 21.9 per cent.

*Example VII*

A series of polymerizations was carried out at −10° C. using different emulsifiers in the following recipe:

| | Parts by weight |
|---|---|
| Butadiene | 70. |
| Styrene | 30. |
| Water, total | 192. |
| Methanol | 48. |
| Potassium chloride | 0.4. |
| Emulsifier | 5.0. |
| Mercaptan blend[1] | 0.1. |
| Tert-butylisopropylbenzene hydroperoxide | 0.472 (2.27 millimols). |
| Tetraethylenepentamine | 0.275 (1.5 millimols). |

[1] See Example I.

A mixture of the emulsifying agent, water, methanol, and potassium chloride was prepared and potassium hydroxide added to adjust the pH to the desired level. To this mixture a solution of the hydroperoxide and mercaptan in the styrene was added in such a way that two layers formed. The materials thus prepared were aged overnight at 0° C. Subsequent to the aging period the mixture was warmed to room temperature, butadiene was added, and the reactor was pressured to 30 pounds per square inch gauge with nitrogen. The temperature was then adjusted to −10° C. Sufficient water was added to the tetraethylenepentamine to make a solution and this mixture was then charged to the reactor. Polymerization was carried out in the conventional manner with the temperature being held at −10° C. The results are herewith presented.

| Emulsifier | pH of Soap Solution | Parts | Conversion, Percent | | | |
|---|---|---|---|---|---|---|
| | | | 2 Hours | 4 Hours | 7 Hours | 24 Hours |
| Rosin soap, K salt [1] | 10.25 | 5.0 | 0 | 1 | 2 | 9 |
| Rosin soap/soap flakes [2] | 10.4 | 3.5/1.5 | 8 | 18 | 32 | 86 |
| Soap flakes [3] | 10.1 | 5.0 | 7 | 13 | 19 | 52 |

[1] Dresinate 214.
[2] Dresinate 214/K-SF flakes.
[3] K-SF flakes.

*Example VIII*

The following recipe was employed for carrying out a series of polymerization runs at −10° C. using four different hydroperoxides as oxidants and various rosin soap-fatty acid soap mixtures:

| | Parts by weight |
|---|---|
| Butadiene | 70. |
| Styrene | 30. |
| Water | 192. |
| Methanol | 48. |
| Rosin soap, potassium salt[1] | Variable. |
| Fatty acid soap, potassium salt[2] | Variable. |
| Mercaptan blend[3] | 0.25. |
| Hydroperoxide | Variable (0.5 millimol). |
| Tetraethylenepentamine | 0.19 (1.0 millimol). |
| Potassium chloride | 0.25. |

[1] Dresinate 214.
[2] Potassium Office Rubber Reserve Soap.
[3] A blend of tertiary $C_{12}$, $C_{14}$, and $C_{16}$ aliphatic mercaptans in a ratio of 3:1:1 parts by weight.

The hydroperoxides employed are designated as follows:

A. Cumene hydroperoxide (dimethylphenylhydroperoxymethane).

B. Diisopropylbenzene hydroperoxide (dimethyl[isopropylphenyl]hydroperoxymethane).

C. Tert-butylisopropylbenzene hydroperoxide dimethyl[tert-butylphenyl]hydroperoxymethane).

D. Tert-amylisopropylbenzene hydroperoxide (dimethyl[tert-amylphenyl]hydroperoxymethane).

The following table shows the materials used and the time-conversion data obtained.

| Dres. 214, Parts | K-ORR Soap, Parts | Hydroperoxide | pH of Emulsifier Solution | Conversion, Percent | | |
|---|---|---|---|---|---|---|
| | | | | 2.5 Hours | 5 Hours | 24 Hours |
| 5.0 | 0.0 | A | 11.3 | 1 | 5 | 22 |
| | | B | 11.3 | 2 | 8 | 29 |
| | | C | 11.3 | 1 | 6 | 34 |
| | | D | 11.3 | 3 | 11 | 44 |
| 3.5 | 1.5 | A | 11.3 | 9 | 13 | 42 |
| | | B | 11.3 | 10 | 16 | 64 |
| | | C | 11.3 | 10 | 17 | 62 |
| | | D | 11.3 | 13 | 22 | 70 |
| 1.5 | 3.5 | A | 11.2 | 10 | 14 | 40 |
| | | B | 11.2 | 12 | 16 | 56 |
| | | C | 11.2 | 14 | 17 | 62 |
| | | D | 11.2 | 15 | 21 | 69 |
| 0.0 | 5.0 | A | 11.2 | 12 | 13 | 37 |
| | | B | 11.2 | 12 | 14 | 47 |
| | | C | 11.2 | 14 | 17 | 54 |
| | | D | 11.2 | 14 | 20 | 61 |

These data show that mixed emulsifiers give better results than when either emulsifier alone is used, and that this effect is more pronounced when the hydroperoxide contains ten and more carbon atoms per molecule.

*Example IX*

The polymerization recipe given in Example VIII was used for carrying out a series of polymerizations using various Dresinate 214-potassium oleate mixtures as the emulsifiers. The oxidant employed in each case was tert-butylisopropylbenzene hydroperoxide. The following results were obtained:

| Dres. 214, Parts | K-Oleate, Parts | pH of Emulsifier Solution | Conversion, Percent | | |
|---|---|---|---|---|---|
| | | | 4 Hours | 7 Hours | 24 Hours |
| 5.0 | 0.0 | 11.30 | 3 | 5 | 28 |
| 4.0 | 1.0 | 11.28 | 12 | 20 | 63 |
| 3.5 | 1.5 | 11.25 | 13 | 21 | 67 |
| 2.5 | 2.5 | 11.32 | 24 | 36 | 76 |
| 1.5 | 3.5 | 11.20 | 24 | 34 | 83 |
| 1.0 | 4.0 | 11.45 | 28 | 37 | 78 |
| 0.0 | 5.0 | 11.25 | 24 | 32 | 76 |

Example X

The basic recipe given in Example VIII was employed for a series of polymerizations using tert-butylisopropylbenzene hydroperoxide as the oxidant and various mixtures of Dresinate 214-potassium Office Rubber Reserve soap as emulsifiers. Polymerizations were effected at +5, −10, and −20° C. For the higher temperature 180 parts water was used while water-methanol mixtures were employed for the lower temperatures. Results are shown in the following table.

| Dres. 214, Parts | K-ORR Soap, Parts | Emuls. Soln., pH | Temp., °C. | Water, Parts | Methanol, Parts | Conversion, Percent | | | | | |
|---|---|---|---|---|---|---|---|---|---|---|---|
| | | | | | | 2 Hours | 4 Hours | 7 Hours | 24 Hours | 31 Hours | 48 Hours |
| 5.0 | 0.0 | 11.2 | +5 | 180 | -------- | 5 | 14 | 24 | 28 | ---- | ---- |
| 3.5 | 1.5 | 11.2 | +5 | 180 | -------- | 19 | 36 | 42 | 62 | ---- | ---- |
| 1.5 | 3.5 | 11.2 | +5 | 180 | -------- | 27 | 50 | 69 | ---- | ---- | ---- |
| 0.0 | 5.0 | 11.2 | +5 | 180 | -------- | 29 | 58 | 82 | ---- | ---- | ---- |
| 5.0 | 0.0 | 11.2 | −10 | 192 | 48 | ---- | 3 | 5 | 26 | ---- | ---- |
| 3.5 | 1.5 | 11.2 | −10 | 192 | 48 | ---- | 8 | 12 | 55 | ---- | ---- |
| 1.5 | 3.5 | 11.2 | −10 | 192 | 48 | ---- | 12 | 19 | 54 | ---- | ---- |
| 0.0 | 5.0 | 11.2 | −10 | 192 | 48 | ---- | 10 | 19 | 46 | ---- | ---- |
| 5.0 | 0.0 | 11.2 | −20 | 168 | 72 | ---- | 0 | 0 | 0 | 0 | 0 |
| 3.5 | 1.5 | 11.3 | −20 | 168 | 72 | ---- | 3 | 3 | 11 | 13 | 24 |
| 1.5 | 3.5 | 11.4 | −20 | 168 | 72 | ---- | 4 | 5 | 14 | 17 | 31 |
| 0.0 | 5.0 | 11.2 | −20 | 168 | 72 | ---- | 7 | 9 | 10 | 13 | 19 |

These data show that there is no increase in the rate of polymerization with the mixed emulsifiers at +5° C., i. e. no synergistic effect is produced. The reaction rates obtained for the soap mixtures were between those for the pure soap systems. At −10 and −20° C., however, there is clearly a greater reaction rate when the soap mixtures are used, thus demonstrating a synergistic effect.

Example XI

It is to be noted that the fatty acid soaps are limited to those containing from 14 to 18 carbon atoms. In a series of polymerizations carried out at −10° C. the emulsifiers employed comprised mixtures of Dresinate 214 with a $C_{12}$ fatty acid soap, potassium laurate, and the oxidant was tert-butylisopropylbenzene hydroperoxide. The same recipe as that hereinbefore given was used. No synergistic effect is demonstrated in the following results.

| Dresinate 214, Parts | K-Laurate, Parts | Emulsifier Solution, pH | Conversion, Percent | | |
|---|---|---|---|---|---|
| | | | 4 Hours | 7 Hours | 24 Hours |
| 5.0 | 0.0 | 11.30 | 2 | 6 | 29 |
| 4.0 | 1.0 | 11.30 | 7 | 12 | 64 |
| 3.5 | 1.5 | 11.45 | 12 | 19 | 76 |
| 2.5 | 2.5 | 11.25 | 17 | 25 | 79 |
| 1.5 | 3.5 | 11.27 | 20 | 29 | 85 |
| 1.0 | 4.0 | 11.42 | 17 | 26 | 82 |
| 0.0 | 5.0 | 11.21 | 21 | 30 | 84 |

Example XII

A series of runs was made using a recipe similar to that used in Example VIII, but with the soap mixture found in that example to be the most effective with these hydroperoxides, and with each of various other hydroperoxides. The polymerization recipe was as follows:

| | Parts by weight |
|---|---|
| Butadiene | 70. |
| Styrene | 30. |
| Water, total | 180. |
| Methanol | 45. |
| Rosin soap, K salt[1] | 3.5. |
| Fatty acid soap, K salt[2] | 1.5. |
| Mercaptan blend[3] | 0.25. |
| Hydroperoxide | Variable. |
| Tetraethylenepentamine | 0.19. |
| Tripotassium phosphate, $K_3PO_4$ | 0.50. |

[1] Dresinate 214: solution pH 12.2.
[2] Potassum Office Rubber Reserve Soap.
[3] A blend of tertiary $C_{12}$, $C_{14}$, and $C_{16}$ aliphatic mercaptans in a ratio of 3:1:1 parts by weight.

The emulsifiers were dissolved in the methanol and to this mixture the water and potassium phosphate were added and the pH adjusted to 12.2 by the addition of potassium hydroxide. A mixture of the styrene, mercaptan, and hydroperoxide was layered on the emulsifier solution and stored over night at 0° C. Butadiene was then introduced, the temperature adjusted to −10° C., and the reactor pressured to 30 pounds per square inch gauge with nitrogen after which the tetraethylenepentamine dissolved in 10 parts water was added. The following results were obtained:

| Hydroperoxide from (parent compound) | Parts | Conversion, Percent | | |
|---|---|---|---|---|
| | | 4 Hours | 6 Hours | 24 Hours |
| 1,2,3,4,4a,9,10,10a - Octahydrophenanthrene | 0.109 | 25 | 37 | 83 |
| Chloro(diisopropyl)benzene | 0.114 | 12 | 21 | 74 |
| Isopropyl(dodecyl)benzene | 0.160 | 7 | 13 | 60 |
| Triisopropylbenzene | 0.118 | 8 | 15 | 71 |
| Phenylcyclohexane | 0.096 | 16 | 26 | 79 |
| Chloro(isopropyl)benzene | 0.093 | 7 | 12 | 60 |
| Methoxy(isopropyl)benzene | 0.091 | 6 | 11 | 49 |
| Methylcyclohexane | 0.065 | 3 | 6 | 28 |
| 1,2,3,4-Tetrahydronaphthalene | 0.082 | 3 | 4 | 8 |
| 5,4-(isopropylphenyl)pentene-2 | 0.110 | 8 | 14 | 54 |

Here, it is to be noted, markedly less desirable results were obtained when the hydroperoxide was prepared from methylcyclohexane or from tetralin, neither of which is a trisubstituted hydroperoxymethane having ten or more carbon atoms per molecule.

Example XIII

A series of −10° C. polymerization runs was made in which different hydroperoxides were used in a ferrous sulfate-sodium pyrophosphate recipe with mixed emulsifiers. The recipe was as follows:

|  | Parts by weight |
|---|---|
| Butadiene | 70. |
| Styrene | 30. |
| Water, total | 192. |
| Methanol | 48. |
| Rosin soap, K salt[1] | 3.5. |
| Fatty acid soap, K salt[2] | 1.5. |
| Mercaptan blend[3] | 0.25. |
| Hydroperoxide | Variable (0.3 millimol). |
| Activator: |  |
| $FeSO_4 \cdot 7H_2O$ | 0.084. |
| $Na_4P_2O_7 \cdot 10H_2O$ | 0.135. |
| KCl | 0.25. |

[1] Dresinate 214; solution pH 10.2.
[2] Potassum Office Rubber Reserve Soap.
[3] A blend of tertiary $C_{12}$, $C_{14}$, and $C_{16}$ aliphatic mercaptans in a ratio of 3:1:1 parts by weight.

The activator solution was prepared by dissolving the ferrous sulfate, sodium pyrophosphate, and potassium chloride in sufficient water to make 10 volumes of solution and heating the resulting mixture at 60° C. for 40 minutes and thereafter cooling it, all in the absence of air.

The soaps were dissolved in methanol, diluted with water, and a mixture of the styrene, mercaptan, and hydroperoxide layered above the emulsifier solution and allowed to stand undisturbed over night at 0° C. The remaining ingredients were then charged and polymerization effected in the conventional manner with the temperature being held at −10° C. The following results were obtained:

| Hydroperoxide from (parent hydrocarbon) | Conversion, Percent | | |
|---|---|---|---|
|  | 4 Hours | 7 Hours | 24 Hours |
| 1,2,3,4,4a,9,10,10a - Octahydrophenanthrene | 38 | 55 | 87 |
| Triisopropylbenzene | 36 | 49 | 85 |
| Phenylcyclohexane | 37 | 50 | 85 |
| Chloro(diisopropyl)benzene | 37 | 50 | 84 |
| Isopropyl(dodecyl)benzene | 29 | 36 | 78 |

As will be evident to those skilled in the art, various modifications of this invention can be made, or followed, in the light of the foregoing disclosure and discussion, without departing from the spirit or scope of the disclosure or from the scope of the claims.

We claim:

1. An improved process for producing a synthetic rubber by polymerization in an aqueous emulsion of a monomeric material comprising a major portion of 1,3-butadiene and containing a rosin acid dispersed therein, which comprises polymerizing said monomeric material while dispersed in an aqueous medium comprising methanol at a polymerization temperature below 0° C. and in the presence of an oxidant-containing polymerization catalyst composition in which said oxidant is a hydroperoxide of diisopropylbenzene, and in the presence of an emulsifying agent comprising 40 to 80 per cent by weight of a potassium salt of a rosin acid and 60 to 20 per cent by weight of a potassium salt of a fatty acid having at least fourteen carbon atoms per molecule, and coagulating a resulting latex with an acid coagulant whereby said rosin acid salt is converted into a rosin acid dispersed in the resulting synthetic rubber so produced.

2. An improved process for producing a synthetic rubber by polymerization in an aqueous emulsion of a monomeric material comprising a major portion of 1,3-butadiene and containing a rosin acid dispersed therein, which comprises polymerizing said monomeric material while dispersed in an aqueous medium comprising methanol at a polymerization temperature below 0° C. and in the presence of an oxidant-containing polymerization catalyst composition in which said oxidant is a hydroperoxide of chloro(diisopropyl)benzene, and in the presence of an emulsifying agent comprising 40 to 80 per cent by weight of a potassium salt of a rosin acid and 60 to 20 per cent by weight of a potassium salt of a fatty acid having at least fourteen carbon atoms per molecule, and coagulating a resulting latex with an acid coagulant whereby said rosin acid salt is converted into a rosin acid dispersed in the resulting synthetic rubber so produced.

3. An improved process for producing a synthetic rubber by polymerization in an aqueous emulsion of a monomeric material comprising a major portion of 1,3-butadiene and containing a rosin acid dispersed therein, which comprises polymerizing said monomeric material while dispersed in an aqueous medium comprising methanol at a polymerization temperature below 0° C. and in the presence of an oxidant-containing polymerization catalyst composition in which said oxidant is a hydroperoxide of methoxy(isopropyl)benzene, and in the presence of an emulsifying agent comprising 40 to 80 per cent by weight of a potassium salt of a rosin acid and 60 to 20 per cent by weight of a potassium salt of a fatty acid having at least fourteen carbon atoms per molecule, and coagulating a resulting latex with an acid coagulant whereby said rosin acid salt is converted into a rosin acid dispersed in the resulting synthetic rubber so produced.

4. An improved process for producing a synthetic rubber by polymerization in an aqueous emulsion of a monomeric material comprising a major proportion of a conjugated diene and containing a rosin acid dispersed therein, which comprises polymerizing said monomeric material while dispersed in an aqueous medium comprising methanol at a polymerization temperature below 0° C. and in the presence of an oxidant-containing polymerization catalyst composition in which said oxidant is a trisubstituted hydroperoxymethane having at least ten and not more than thirty carbon atoms per molecule and in which each of the three substituent groups is an organic radical and in the presence of an emulsifying agent comprising 40 to 80 per cent by weight of a potassium salt of a rosin acid and 60 to 20 per cent by weight of a potassium salt of a fatty acid having at least fourteen carbon atoms per molecule, and coagulating a resulting latex with an acid coagulant whereby said rosin acid salt is converted into a rosin acid dispersed in the resulting synthetic rubber so produced.

5. An improved process for producing a synthetic rubber by polymerization in an aqueous emulsion of a monomeric material comprising a major portion of 1,3-butadiene and containing a rosin acid dispersed therein, which comprises polymerizing said monomeric material while dispersed in an aqueous medium comprising methanol at a polymerization temperature below 0° C. and in the presence of a polymerization catalyst composition comprising a hydroperoxide of diisopropylbenzene and tetraethylenepentamine and in the presence of an emulsifying agent comprising 40 to 80 per cent by weight of a potassium salt of a rosin acid and 60 to 20 per cent by weight of a potassium salt of a fatty acid having at least fourteen carbon atoms per molecule, and coagulating a resulting latex with an acid coagulant whereby said rosin acid salt is converted into a rosin acid dispersed in the resulting synthetic rubber so produced.

6. In a process for the polymerization of a monomeric material comprising a major amount of a conjugated diene having not more than six carbon atoms per molecule, the improvement which comprises polymerizing said monomeric material at a polymerization temperature below 0° C. while dispersed in an aqueous medium comprising methanol and in the presence of an emulsifying agent comprising 40 to 80 per cent by weight of a potassium salt of a rosin acid and 60 to 20 per cent of a potassium salt of a saturated fatty acid having from fourteen to eighteen carbon atoms per molecule and also in the presence of an oxidant-containing polymerization catalyst composition in which said oxidant is a trisubstituted hydroperoxymethane having ten to thirty carbon atoms per molecule.

7. In a process for polymerizing in aqueous dispersion a monomeric material comprising an unsaturated organic compound containing a $CH_2=C<$ group and polymerizable while so dispersed and obtaining a resulting polymer having a rosin acid dispersed therein, the improvement which comprises effecting such a polymerization in the presence of an oxidant-containing polymerization catalyst composition in which said oxidant is a trisubstituted hydroperoxymethane having at least ten and not more than thirty carbon atoms per molecule and in the presence of an emulsifying agent comprising 40 to 80 per cent by weight of a potassium salt of a rosin acid and 60 to 20 per cent by weight of a potassium salt of a fatty acid having at least fourteen carbon atoms per molecule, and coagulating a resulting latex with an acid coagulant whereby said rosin acid salt is converted into a rosin acid dispersed in the resulting synthetic rubber so produced.

8. In a process for polymerizing in aqueous dispersion a monomeric material comprising an unsaturated organic compound containing a $CH_2=C<$ group and polymerizable while so dispersed and obtaining a resulting polymer having a rosin acid dispersed therein, polymerizing said monomeric material at a polymerization temperature below 0° C. in the presence of an aqueous medium comprising methanol and in the presence of an oxidant-containing polymerization catalyst in which said oxidant is a trisubstituted hydroperoxymethane having at least ten and not more than thirty carbon atoms per molecule and in the presence of an emulsifying agent comprising 40 to 80 per cent by weight of a potassium salt of a rosin acid and 60 to 20 per cent by weight of a potassium salt of a fatty acid having at least fourteen carbon atoms per molecule, and coagulating a resulting latex with an acid coagulant whereby said rosin acid salt is converted into a rosin acid dispersed in the resulting synthetic rubber so produced.

9. A process for producing a synthetic rubber which contains a small amount of a rosin acid, which comprises polymerizing a monomeric material comprising a major amount of a conjugated diene having from four to six carbon atoms per molecule while dispersed in an aqueous medium at a polymerization temperature below 0° C. and in the presence of a synergistic combination of polymerization catalyst and rosin soap-containing emulsifying agent comprising as said polymerization catalyst an oxidant-reductant combination comprising as an oxidant a trisubstituted hydroperoxymethane having at least ten and not more than thirty carbon atoms per molecule and as said emulsifying agent a mixture comprising 40 to 80 per cent by weight of a potassium salt of a rosin acid and 60 to 20 per cent by weight of a potassium salt of a fatty acid having at least fourteen and not more than eighteen carbon atoms per molecule, subsequent to said polymerization coagulating a resulting latex with an acid coagulant, and recovering a resulting rosin acid-containing synthetic rubber so produced.

10. A process for producing a synthetic rubber by polymerization of a monomeric material dispersed in an aqueous medium in the presence of an emulsifying agent comprising a soap of a rosin acid, which comprises polymerizing a monomeric material comprising a major amount of a conjugated diene having from four to six carbon atoms per molecule while dispersed in an aqueous medium at a polymerization temperature below 0° C. and in the presence of a synergistic combination of polymerization catalyst and rosin soap-containing emulsifying agent comprising as said polymerization catalyst an oxidant-reductant combination comprising as an oxidant a trisubstituted hydroperoxymethane having at least ten and not more than thirty carbon atoms per molecule and as said emulsifying agent a mixture comprising 40 to 80 per cent by weight of a potassium salt of a rosin acid and 60 to 20 per cent by weight of a potassium salt of a fatty acid having at least fourteen and not more than eighteen carbon atoms per molecule.

11. The process of claim 10 in which said trisubstituted hydroperoxymethane is dimethyl-(isopropylphenyl)hydroperoxymethane.

12. The process of claim 10 in which said trisubstituted hydroperoxymethane is a hydroperoxide of chloro(diisopropyl)benzene.

13. The process of claim 10 in which said trisubstituted hydroperoxymethane is a hydroperoxide of methoxy(isopropyl)benzene.

14. A process for producing a synthetic rubber by polymerization of a monomeric material dispersed in an aqueous medium in the presence of an emulsifying agent comprising a soap of a rosin acid, which comprises polymerizing a monomeric material comprising a major amount of a conjugated diene having from four to six carbon atoms per molecule while dispersed in an aqueous medium at a polymerization temperature below 0° C. and in the presence of a synergistic combination of polymerization catalyst and rosin soap-containing emulsifying agent comprising as said polymerization catalyst an oxidant-reductant combination comprising as an oxidant a trisubstituted hydroperoxymethane having at least ten and not more than thirty carbon atoms per molecule and as a reductant an ethylene polyamine and as said emulsifying agent a mixture comprising 40 to 80 per cent by weight of a potassium salt of a rosin acid and 60 to 20 per cent by weight of a potassium salt of a fatty acid having at least fourteen and not more than eighteen carbon atoms per molecule.

15. The process of claim 10 in which said trisubstituted hydroperoxymethane is a hydroperoxide of chloro(isopropyl)benzene.

16. In a process for producing synthetic rubber by polymerization in an aqueous emulsion of a polymeric material comprising 65 to 90 per cent by weight 1,3-butadiene and the remainder styrene at a polymerization temperature below 0° C. in the presence of an aqueous medium containing methanol as an antifreeze constituent and in the presence of a redox polymerization catalyst, the improvement which comprises using as the emulsifying agent in said polymerization a mixture comprising 40 to 80 per cent by weight of a potassium salt of a rosin acid and 60 to 20 per cent of a potassium salt of a saturated fatty acid having from fourteen to eighteen carbon atoms per molecule and as the oxidant for said redox catalyst dimethyl (diisopropylphenyl) hydroperoxymethane.

17. In a process for producing synthetic rubber by polymerization in an aqueous emulsion of a polymeric material comprising 65 to 90 per cent by weight 1,3-butadiene and the remainder styrene at a polymerization temperature below 0° C. in the presence of an aqueous medium containing methanol as an antifreeze constituent and in the presence of a redox polymerization catalyst, the improvement which comprises using as the emulsifying agent in said polymerization a mixture comprising 40 to 80 per cent by weight of a potassium salt of a rosin acid and 60 to 20 per cent of a potassium salt of a saturated fatty acid having from fourteen to eighteen carbon atoms per molecule and as the oxidant for said redox catalyst a dimethyl (alkylphenyl) hydroperoxymethane having not more than thirty carbon atoms per molecule.

References Cited in the file of this patent

UNITED STATES PATENTS

| Number | Name | Date |
| --- | --- | --- |
| 2,395,523 | Vaughn et al. | Feb. 26, 1946 |
| 2,446,797 | Vaughn et al. | Aug. 10, 1948 |
| 2,450,416 | Borglin | Oct. 5, 1948 |
| 2,508,734 | Troyan | May 23, 1950 |
| 2,569,480 | Lorand | Oct. 2, 1951 |
| 2,581,402 | Fryling | Jan. 8, 1952 |
| 2,609,362 | Fryling et al. | Sept. 2, 1952 |

OTHER REFERENCES

Shearon et al.: Ind. and Eng. Chem., vol. 40, No. 5, May 1948, pages 769–777.